(12) United States Patent
Van Oevelen et al.

(10) Patent No.: US 7,301,330 B2
(45) Date of Patent: Nov. 27, 2007

(54) ELECTRONIC SENSING CIRCUIT THAT COMPENSATES FOR REFERENCE VOLTAGE DRIFT

(75) Inventors: Jacobus Adrianus Van Oevelen, Nijmegen (NL); Stefan Butzmann, Hagen (DE); Reinhard Buchhold, Hamburg (DE); Thomas Stork, Hamburg (DE); Hendrik Boezen, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/572,106

(22) PCT Filed: Sep. 9, 2004

(86) PCT No.: PCT/IB2004/051723

§ 371 (c)(1),
(2), (4) Date: Mar. 15, 2006

(87) PCT Pub. No.: WO2005/029706

PCT Pub. Date: Mar. 31, 2005

(65) Prior Publication Data

US 2007/0059936 A1 Mar. 15, 2007

(30) Foreign Application Priority Data

Sep. 19, 2003 (EP) .................................. 03103471

(51) Int. Cl.
*G01B 7/30* (2006.01)

(52) U.S. Cl. ..................... 324/207.21; 324/207.25; 324/207.24; 324/174

(58) Field of Classification Search ................................ 324/207.12–207.26, 166, 173, 174
See application file for complete search history.

(56) References Cited

U.S. PATENT DOCUMENTS

| | | | |
|---|---|---|---|
| 3,767,938 A * | 10/1973 | Kueper ........................ 327/58 |
| 4,765,342 A | 8/1988 | Urman et al. | |
| 4,833,405 A * | 5/1989 | Richards et al. ........ 324/207.22 |
| 5,043,685 A * | 8/1991 | Nyce ........................... 333/148 |
| 5,198,764 A * | 3/1993 | Spencer ................. 324/207.26 |
| 5,477,142 A | 12/1995 | Good et al. | |
| 5,532,583 A * | 7/1996 | Davis et al. ................. 324/202 |
| 6,100,680 A * | 8/2000 | Vig et al. ................ 324/207.2 |
| 6,242,908 B1 | 6/2001 | Scheller et al. | |

* cited by examiner

*Primary Examiner*—Jay M Patidar (57) ABSTRACT

A sensor (10) has an output coupled to a first comparator input. A control circuit (18) is arranged to switch from an upward tracking mode to a downward relative level detection mode, to a downward tracking mode, to an upward relative level detection mode and back to the upward tracking mode successively. A first and second digital to analog conversion circuit (14a,b) receive a first and second digital control value from the control circuit (18) respectively. A controllable combiner circuit (16) has inputs coupled to outputs of the first and second digital to analog conversion circuits (14a,b) and an output coupled to the second comparator input, the control circuit (18) having first output coupled to controllable combiner circuit (16) to cause the combiner circuit (16) to supply first and second combiner output signals determined by the first and second digital to analog conversion circuit (14a,b) to the second comparator input in the upward and downward tracking mode respectively, and to supply a third combiner output signal corresponding to an average of the first and second combiner output signals to the second comparator input in the relative level detection modes. The control circuit (18) has an input coupled to the output of the comparator (12), the control circuit (18) controlling one directional upward tracking by the first digital to analog conversion circuit (14a) of upward changes of the sensing signal in the upward tracking mode, and controlling one directional downward tracking by the second digital to analog conversion circuit (14b) Of downward changes of the sensing signal in the upward tracking mode.

11 Claims, 6 Drawing Sheets

ELECTRONIC SENSING CIRCUIT THAT COMPENSATES FOR REFERENCE VOLTAGE DRIFT

Unknown or even drifting offset voltages often form a problem during electronic processing of output signals from analog sensors. To obtain information that can be processed digitally, such as information about a time point when a sensing signal crosses a predetermined level, or about the level of the sensing signal relative to a predetermined level at a given time point, the sensing signal has to be compared with a reference level. Offset voltages, both in the reference level and in a comparator circuit that compares the reference level with the sensing signal, can confuse this comparison.

One solution to the problem of a reference voltage drift is to define the reference level relative to the minimum and maximum level assumed by the sensing signal. This is particularly useful for sensing signals that vary repeatedly between the minimum and the maximum as a function of a parameter that is being sensed. Both analog and digital solutions for doing so are possible. In an analog solution peak level detectors with a diode and a capacitor may be used to establish the minimum and maximum values, combined with a voltage divider network to generate the reference level from the established minimum and maximum. Unfortunately, such a solution suffers from current leakage problems, which are particularly severe in high temperature environments often encountered in sensor circuits.

In a digital solution an A/D conversion of the signal is made, the minimum and maximum digital values are determined and used to compute the reference level. In a digital post-processing solution this may be used for digital scaling of other digitized values, but such post processing does not make it possible make an accurate determination of a time point where the sensing signals crosses a predetermined level; also this solution requires high resolution. In another embodiment the digital values of the minimum and maximum are used to compute the reference level digitally and the computed reference level is converted back into an analog value against which the sensing signal is compared in an analog way. Thus, transition timing can be preserved. However, such a solution involves considerable circuit overhead and it may still suffer from offsets in the comparator that compares the sensing signal with the generated reference level.

Among others, it is an object of the invention to provide for an electronic sensing circuit that defines a reference level for comparison with a sensing signal which does not suffer from unknown offsets or drift inherent in analog solutions and does not require the high overhead of fully digital solutions.

The invention provides for an electronic sensing circuit. This circuit compares the sensing signal with a reference level that is generated using minimum and maximum values. In this circuit all critical comparisons, both to determine the minimum and maximum values and to compare the sensing signal with the reference level are performed with the same comparator. Thus any offset of this comparator does not affect the result. During a period of the sensing signal the circuit switches between relative level detection modes and tracking modes to determine the minimum and maximum. Maximum and minimum values are generated with a D/A converter circuit. In an upward and downward tracking mode signals determined by a first and second digital control signals value are supplied as reference level to the comparator respectively, and the relevant D/A converter circuit is made to track changes of the sensing signal in respective directions only, until the comparator indicates that the sensing signal is below and above the supplied reference level respectively.

Preferably, a first and a second D/A converter circuit are used to generate maximum and minimum values in response to the respective control signal values. This reduces the effect of conversion errors. In an upward and downward tracking mode signals dominated by the output of the first and second D/A converter circuit are supplied as reference level to the comparator respectively, and the relevant D/A converter circuit is made to track changes of the sensing signal in respective directions only, until the comparator indicates that the sensing signal is below and above the supplied reference level respectively.

In the relative level detection mode, an average of the signals supplied as reference level in the upward and downward tracking modes is supplied to the comparator as a reference level. Preferably, the these signals are weighed equally in the average, but in other embodiments unequal weights may be used, for example if the comparator is used to compare the sensing signal with multiple levels as apart of multi-bit A/D conversion relative to the minimum and maximum value. Preferably the signals supplied as reference level in the upward and downward tracking modes are determined exclusively by the first and second D/A converter circuit respectively, without being affected by the other D/A converter circuit. However the result is not affected if the signals supplied as reference level have a cross dependence. Preferably the circuit remains in the relative level detection mode until the comparator indicates that the sensing signal has crossed the supplied reference level.

Preferably the control circuit is arranged to reset the digital control values of the D/A converter circuit at or before switching to the tracking mode in which that D/A converter tracks the sensing signal, in the case of upward tracking to a level below the value assumed during a previous upward tracking mode and in the case of downward tracking to a level above the value assumed during a previous downward tracking mode. Thus, temporal changes in the maxima and minima exhibited by the sensing signal can be accounted for. Preferably the digital control values are reset to the minimum and maximum possible values. But in an embodiment, they may be reset to a lesser extent, for example by lowering or raising by a predetermined number of digital steps. Thus a protection can be provided against errors due to local minima or maxima.

Preferably, a latch is provided at the output of the comparator, the latch being allowed to pass the output signal of the comparator in the relative level detection modes, the latch holding a previous signal in the tracking modes. Thus, the reference level selection mechanism is transparent for further circuits following the latch.

Preferably, the switch from the tracking modes to the relative level detection modes is performed automatically when it has been detected that the maximum or the minimum has been passed. This may be realized for example by detection that no upward or downward changes of the output signal of the D/A converters where necessary during a time interval of predetermined length in the upward and downward tracking mode respectively. In another embodiment this is detected by detecting whether the sensing signal has dropped or risen more than a threshold level below or above the maximum or the minimum in the upward and downward tracking mode respectively. Advantageously the necessary comparisons for the switch to the relative level detection modes are performed using the comparator that is also used for establishing the maxima and minima and the relative level detection, but, since these comparisons do not directly affect the reference level during relative level detection, other comparators may be used without affecting the offset.

These and other objects and advantageous aspects of the invention will be illustrated in a non limitative way using the following figures.

FIG. 1 shows a sensor circuit with a sensing part 10, a comparator 12, a pair of digital to analogue (D/A) converter circuit 14a,b, a switchable combiner circuit 16, a control circuit 18 and a latch 19. D/A converter circuits 14a,b have analogue signal outputs coupled to combiner circuit 16. Sensing part 10 and switchable combiner circuit 16 have outputs coupled to inputs of comparator 12, which has an output coupled to latch 19. Control circuit 18 has in input coupled to the output of comparator 12 and digital signal outputs coupled to inputs of D/A converter circuits 14a,b, to switchable combiner circuit 16 and to latch 19.

In operation sensing part produces a sensing signal that has an oscillatory nature, going up and down between a minimum and a maximum value. Relevant information is contained in the time points at which the sensing signal crosses the level halfway the minima and the maxima.

Figure 1:
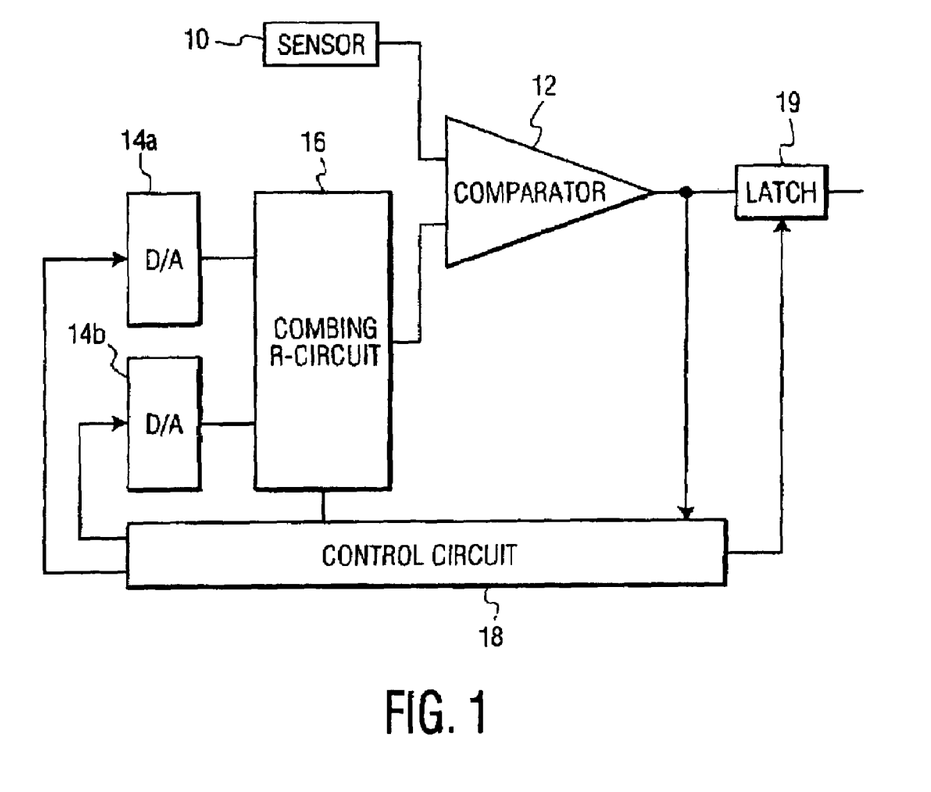
FIG. 1 shows a sensor circuit

In one embodiment the sensor circuit functions to cause the output of latch 19 to undergo signal level transitions at time points that are in a fixed relation to the time points at which the sensing signal from sensing part 10 crosses a level at a predetermined level relative to the maximum and the minimum values of the sensing signal of sensing part 10 (typically the halfway level). It should be noted that use of a single such level (typically the halfway level) serves to illustrate one important application of the invention, but that other applications are possible, where comparisons with a plurality of levels defined relative to the minimum and maximum values are possible. This may be used for example in a multibit analog to digital converter. Similarly, preservation of an accurate timing relationship with a level crossing is important in one application, but in other applications it may suffice to determine whether a sensing signal is above or below a level at a specific time point. In this case the time of the level crossing need not be preserved.

All critical comparisons, i.e. both the comparisons required to determine the minima and the maxima, and any the comparisons with a level or levels defined relative to the minima and the maxima (such as the halfway level) and are made by comparator 12, so that the offset of comparator 12, if any, plays no part in the determination of the time points. Preferably, all necessary comparison are made using the one comparator 12, but without deviating from the invention some comparisons that do not directly affect the level against which the sensing signal is compared may be performed with other comparators.

Figure 2:
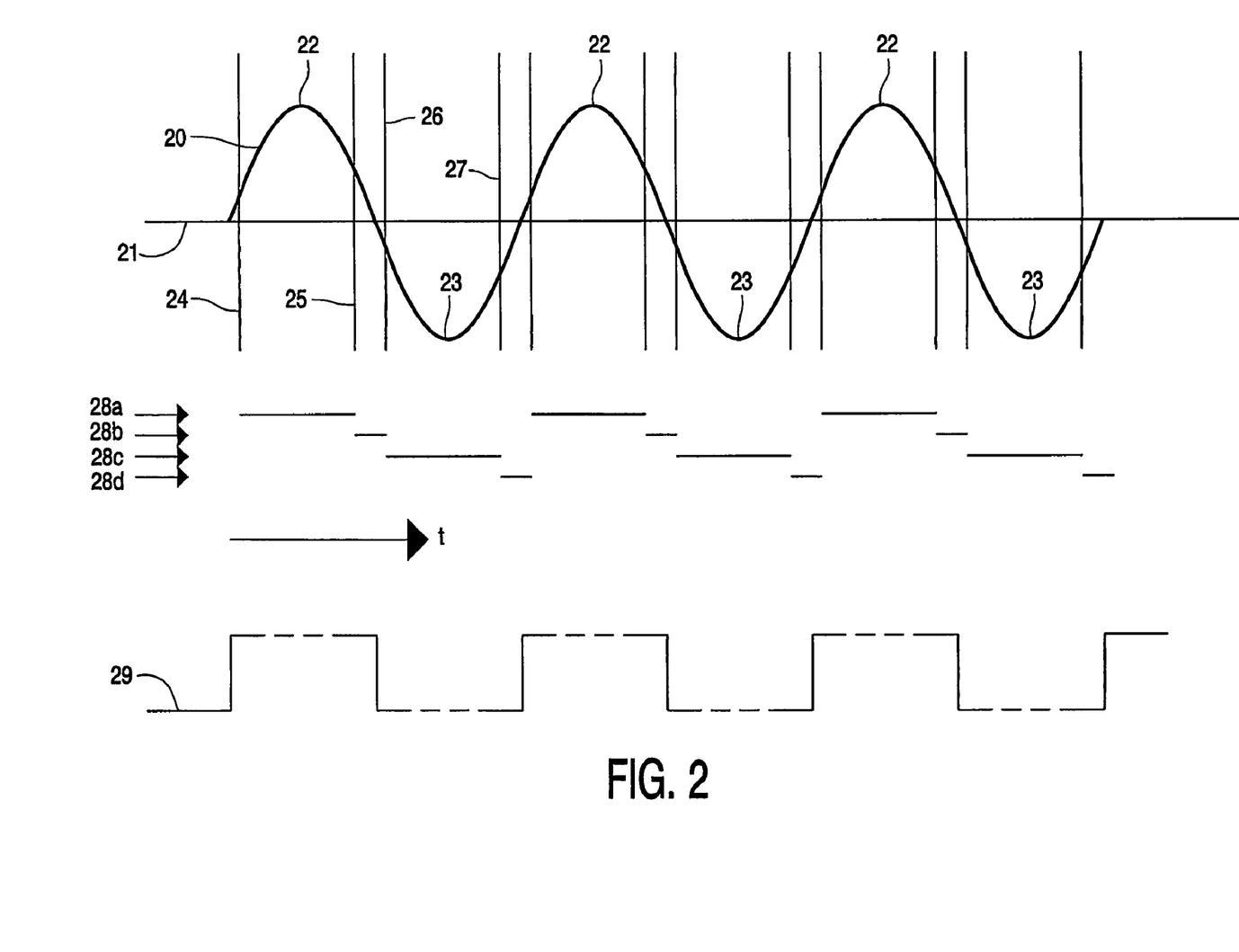
FIG. 2 shows signals involved in sensing

FIG. 2 shows an example of a sensing signal 20 from sensing part 10 with maxima 22 and minima 23 and a halfway level 21. Control circuit periodically assumes four states, during respective time intervals 28a-d.

In an upward tracking state, assumed during time intervals 28a, control circuit 18 causes first D/A converter circuit 14a to follow upward changes in sensing signal 20. In this state control circuit 18 causes combiner circuit 16 to output the voltage from first D/A converter circuit 14a. Comparator 12 compares this voltage with the sensing signal 20 from sensing part 10. If the output signal from comparator 12 indicates that the voltage from first D/A converter circuit 14a is below sensing signal 20, control circuit 18 raises the digital input signal of first D/A converter circuit 14a stepwise until comparator 12 indicates that the voltage from first D/A converter circuit 14a is above sensing signal 20. In this upward tracking state control circuit 18 causes latch 19 to retain its logic output value (a logic high value). When control circuit 18 switches to the upward tracking state, it first resets the digital input signal of first D/A converter circuit 14a to a level below the maximum value that will be assumed, typically to the lowest possible level.

In an upward and downward relative level detection state, assumed during time intervals 28b, 28d control circuit 18 causes comparator to compare sensing signal 20 with the average of the output signals of D/A converter circuits 14a,b. In these states control circuit 18 keeps the digital input signals of D/A converter circuits 14a,b constant and causes combiner circuit 16 to output an average of the output voltages of D/A converter circuits 14a,b. During this time control circuit 18 causes latch 19 to output a signal that follows the output signal of comparator 12.

A downward tracking state of control circuit, assumed during time intervals 28c, is the same as the upward tracking state, except that control circuit 18 causes second D/A converter circuit 14b to follow downward changes in sensing signal 20. In this downward tracking state control circuit 18 causes latch 19 to retain the logic output value of comparator at the end of the downward relative level detection state (a logic low value). When control circuit 18 switches to the downward tracking state, it first resets the digital input signal of second D/A converter circuit 14a to a level above the minimum value that will be assumed, typically to the highest possible level.

The resulting output of latch 19 is shown by trace 29, wherein the solid parts indicate where latch 19 follows the output of comparator 12 (in the upward and downward relative level detection states during time intervals 28b,d) and the dashed lines indicate where latch holds a previous value (in the upward and downward tracking states during time intervals 28b,d).

Control circuit 18 may trigger the transitions between the states in various ways. In one example, control circuit 18 switches from the upward tracking state to the downward relative level detection state at a time point 25 when a time interval of predetermined length has occurred without any rise in the digital input signal that is applied to first D/A converter circuit 14a. Similarly, control circuit 18 switches from the downward tracking state to the upward relative level detection state at a time point 25 when a time interval of predetermined length has occurred without any lowering in the digital input signal that is applied to second D/A converter circuit 14b. A switch from the downward relative level detection state to the downward tracking state and a switch from the upward relative level detection state to the upward tracking state may occur in response to the level change of the output signal of comparator 12 during time intervals 28b,d. Preferably, intermediate states are provided between the relative level detection states and the tracking states to reset the digital input signal of the relevant D/A converter circuit 14a,b prior to the tracking state.

In another embodiment control circuit 18 switches from the upward tracking state to the downward relative level detection state at a time point 25 when the sensing signal is more than a predetermined fraction of the distance between the voltages output by first and second D/A converter circuits 14a,b below the output voltage of the first D/A converter circuit 14a. Similarly in this embodiment control circuit 18 switches from the downward tracking state to the upward relative level detection state at a time point 25 when the sensing signal is more than a predetermined fraction of the distance between the voltages output by first and second D/A converter circuits 14a,b above the output voltage of the first D/A converter circuit 14a.

Figure 3:
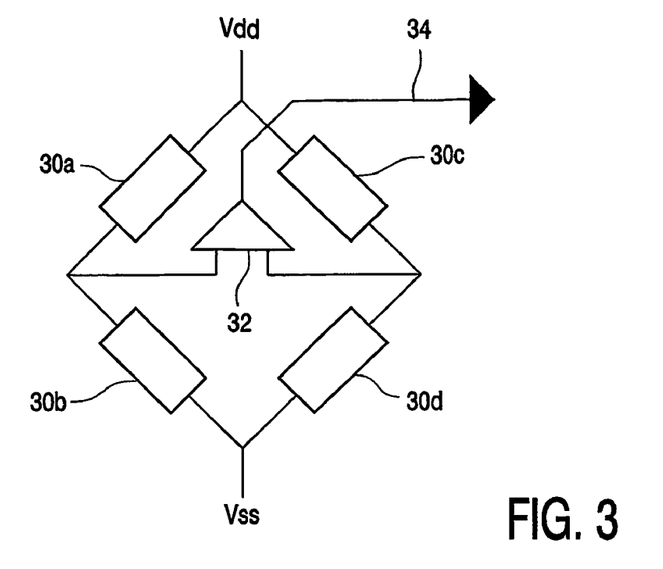
FIG. 3 shows a sensing part of a sensor circuit

FIG. 3 shows an embodiment of sensing part 10. This embodiment contains a Wheatstone bridge of sensing resistors 30a-d and a differential sense amplifier 32 coupled to the outputs of the Wheatstone bridge. A single ended output 34 of sense amplifier 32 is coupled to an input of comparator 12 (not shown). In a typical embodiment the influence of an external factor that has to be sensed, such as the rotation of a cam wheel, makes the resistance values of the four sensing resistors 30a-d vary periodically with substantially the same waveform, but with mutually different phase. In this case the sensing resistors may be connected in the Wheatstone bridge so that the voltages at the outputs of the Wheatstone bridge relative to the supply terminals vary with same waveform but with mutually different phase.

Figure 4:
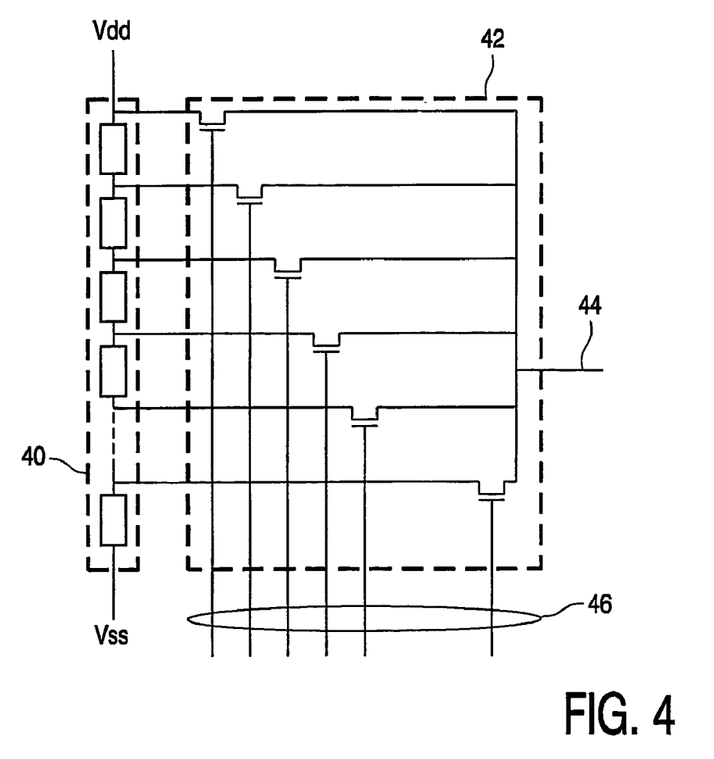
FIG. 4 shows a digital to analog converter circuit

FIG. 4 shows an embodiment of a D/A converter, which may be used to implement first and second D/A converter circuit 14a,b. The D/A converter comprises a resistive voltage divider network 40, and a switching circuit 42. The voltage divider network contains a number of resistors coupled in series between two power supply connections Vdd, Vss. Nodes between the resistors are coupled to a common output 44, each via the main current channel of a respective switching transistor in switching circuit 42. Control circuit 18 (not shown) is coupled to the control electrodes of the transistors via an interface 46 and makes a selected one of the transistors conductive to control an analogue output voltage at the output 44. Preferably, resistive voltage divider network 40 is shared by the first and second D/A converter circuit 14a,b, each D/A converter circuit 14a,b having its own switching circuit 42.

Figure 5:
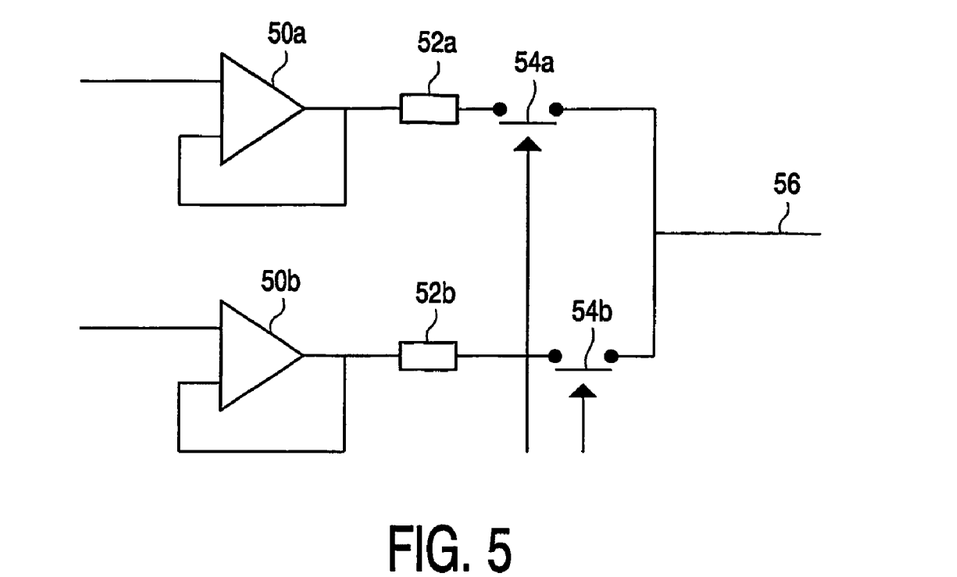
FIG. 5 shows a combiner circuit

FIG. 5 shows an embodiment of a switchable combiner circuit. The circuit contains a pair of buffer amplifiers 50a,b, with differential inputs, the negative input (from which a voltage rise would lead to a drop in the output signal) being coupled to the output of the buffer amplifier 50a,b, the positive input being coupled to the output of a corresponding D/A converter circuit 14a,b (not shown). The outputs of buffer amplifiers 50a,b are coupled to an output 56 of the combiner circuit, each via a respective series connection of a resistive element 52a,b and a switch 54a,b. The resistive elements 52a,b have equal values. The switches 54a,b are controlled by control circuit 18 (not shown), the control circuit making one switch 54a and another switch 54b conductive in the upward and downward tracking states respectively, and making both switches 54a,b conductive in the upward and downward relative level detection states. Of course, emitter or source followers may be used instead of buffer amplifiers 50a,b, amplification greater than 1 is not required.

Figure 6:
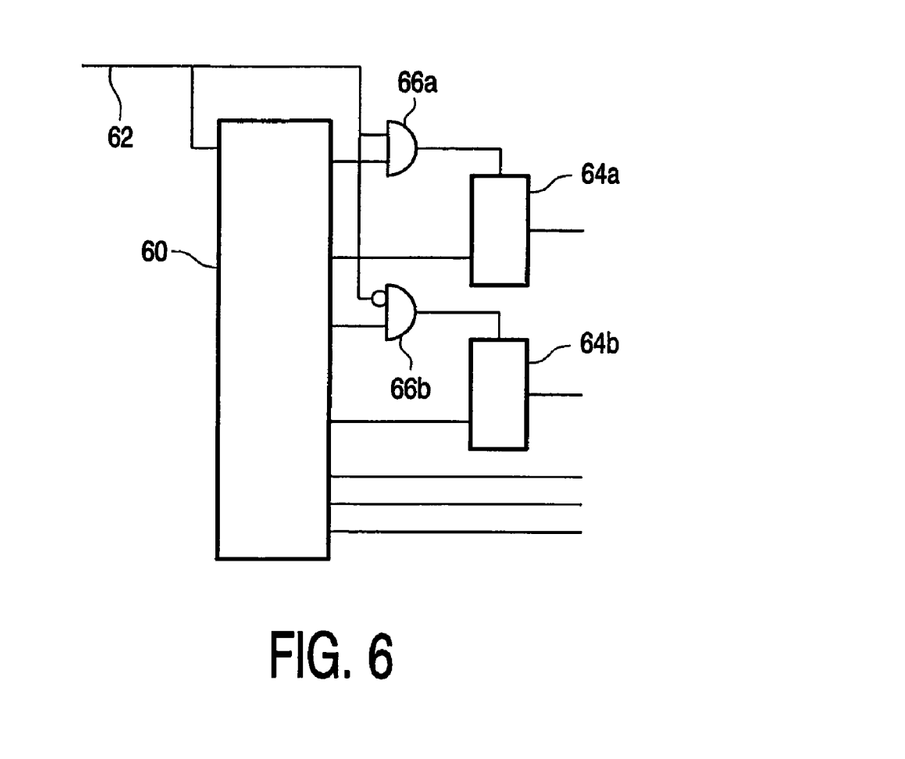
FIG. 6 shows a control circuit

FIG. 6 shows an embodiment of control circuit 18, containing a state machine 60, a pair of counters 64a,b and a pair of logic gates 66a,b. The input 62, which is coupled to the output of comparator 12 (not shown), is coupled to state machine 60 and, via logic gates 66a,b, to clock inputs of counters 64a,b. State machine 60 has outputs coupled to reset inputs of counters 64a,b and, to the clock inputs of counters 64a,b, via logic gates 66a,b. Furthermore, state machine 60 has outputs coupled to the switchable combiner circuit (not shown) and the latch (not shown).

In operation state machine 60 switches between various states. When switching to the upward tracking state, state machine 60 temporarily supplies a reset signal to one of the counters 64a (the maximum counter) and subsequently causes the signal from the output of comparator 12 to be passed to the maximum counter 64a State machine signals to latch 19 to hold its output data and to combiner circuit 16 to pass the signal from first D/A converter circuit 14a The output of maximum counter 64a controls D/A conversion by first D/A converter circuit 14a. For this purpose maximum counter 64a may be a Johnson counter that supplies logic high signals to transistors in switching circuit 42 that are coupled to increasingly higher nodes in divider structure 40 as counter 64a counts up.

In response to a logic high signal from comparator 12 maximum counter 64a counts up until comparator 12 indicates that the resulting output of first D/A converter circuit 14a exceeds sensing signal 20. To count up clock pulses (not shown) may be supplied to counter 64a, or counter 64a may be enabled to count up under influence of clock pulses as long as comparator outputs a logic high. Next state machine 60 determines whether sensing signal 20 has passed its maximum.

Figure 7:
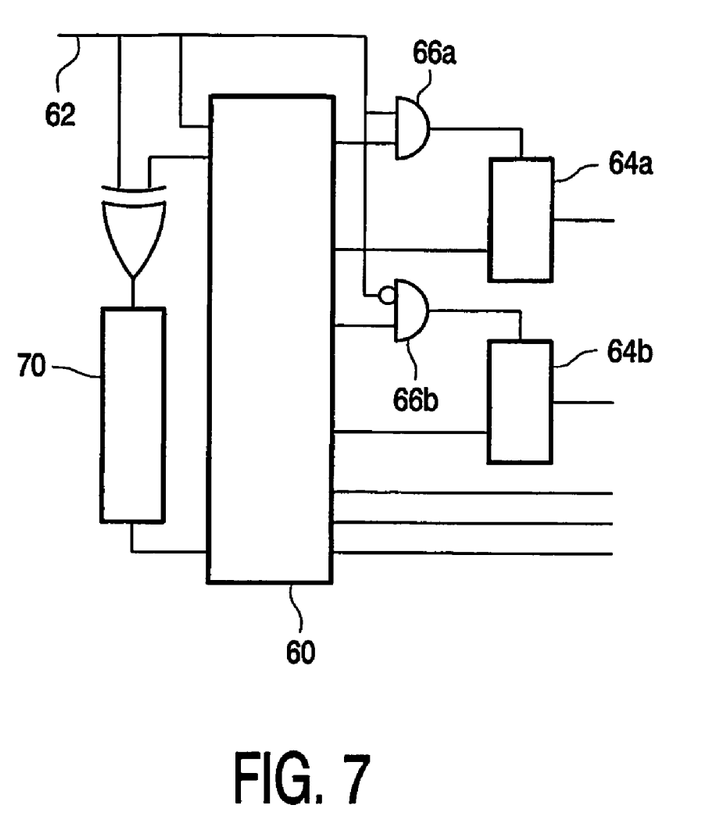
FIG. 7 shows a further control circuit

FIG. 7 shows an embodiment with a timing circuit 70 for this purpose, which is reset each time when comparator 12 outputs a logic high and signals that sensing signal 20 has passed the maximum when a predetermined time has expired without such a logic high. In response to detection that sensing signal 20 is past its the maximum, state machine switches from the upward tracking state to the downward relative level detection state.

In the downward relative level detection state, state machine 60 blocks counting by counters 64a,b, causes combiner circuit to output the average of the outputs of first and second D/A converter circuit 14a,b and then causes latch 19 to pass signals from comparator 12. The output signal of comparator 12 will initially be logic high, but will drop to logic low when sensing signal 20 passes the level midway the voltages output by first and second D/A converter circuits 14a,b. Upon this transition state machine switches to the downward tracking state.

Operation in the downward tracking state is similar to that in the upward tracking state, except that state machine now causes combiner circuit 16 to output the signal from second D/A converter circuit and that minimum counter 64b, after being reset to a maximum value, counts down when the output of comparator 12 is logic low. State machine switches from the downward tracking state to the upward relative level detection state when it detects that sensing signal 20 has past its minimum, for example using a timer to detect that no logic low has occurred during a time interval of predetermined length.

Operation in the downward relative level detection state is similar to operation in the upward relative level detection state, except that state machine 60 switches to the upward tracking state when the output signal of comparator 12 switches to logic high.

Although it has been assumed that state machine 60 stores information about its own state, it should be appreciated that the output of latch 19 may be used to control part of the state of state machine 60.

Although one implementation of the detection that sensing signal 20 has passed its maximum or minimum has been described using a timer circuit, it should be appreciated that other implementations are possible. In another embodiment this may be detected from the distance between sensing signal 20 and the output of the D/A converter circuit 14a,b: if, in the upward tracking state, sensing signal 20 is more than a threshold below the output of first D/A converter circuit 14a, the state machine switches to the downward relative level detection state.

Detection of this threshold passing may be realized by providing an additional comparator circuit (not shown) that compares sensing signal 20 with a weighted average of the output signals of first and second D/A converter circuits 14a,b, the output signal of first D/A converter circuit 14a being weighted more heavily (e.g. by ¾) than the output signal of second D/A converter circuit 14b (e.g. by ¼). In this embodiment the output of additional comparator circuit (not shown) is coupled to the input of state machine 60 to cause the transition from the upward tracking state to the downward relative level detection state. A similar comparison, is used in the downward tracking state but with a weighted average wherein the output signal of first D/A converter circuit 14a is weighted less (e.g. by ¼) than the output signal of second D/A converter circuit 14b (e.g. by ¾).

Figure 8:
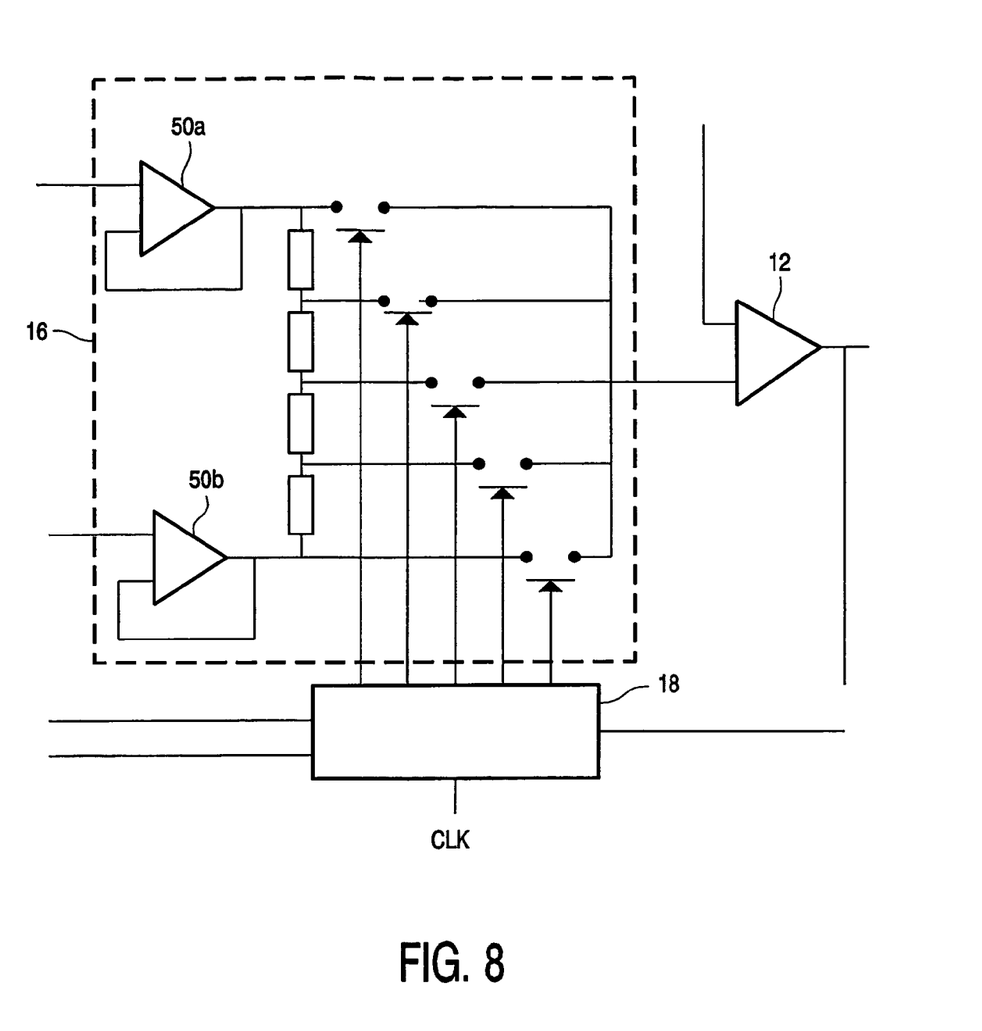
FIG. 8 shows part of a sensor circuit

FIG. 8 shows another embodiment that realizes these comparisons using comparator 12. In this case combiner circuit 16 is arranged to output a selectable one of the output signal V1 of first D/A converter circuit 14a, the output signal V2 of second D/A converter circuit 14b, the average (V1+V2)/2 and thresholds (3V1+V2)/4 and (V1+3V2)/4. This may be realized by including a series arrangement of four weighting resistors between the outputs of buffer amplifiers 50a,b and by providing switches to tap the signals from selectable ones of the nodes in this series arrangement. In the upward tracking state machine 60 causes combiner circuit to toggle under influence of a clock signal between outputting V1 and (3V1+V2)/4, maximum counter 64a being incremented when V1 is selected and the output when (3V1+V2)/4 being used to control switching to the downward relative level detection state. A similar arrangement may be used to switch from the downward tracking state.

It will be appreciated that the latter embodiment has the advantage that it is not affect by offset voltage errors from comparator 12 and does not require any assumption about the frequency of sensing signal 20. However, the thresholds (3V1+V2)/4 and (V1+3V2)/4 for switching from the upward and downward tracking states are not critical so if the sensing signal is sufficiently large an additional comparator may be used. Also, of course, weights other than ¼ and ¾ may be used. However, other methods of deciding about the switch to the relative level detection state may be used, e.g. a time-out after a predetermined time interval after crossing the average level.

It will be appreciated that the invention is not limited to the embodiments shown. For example, instead of the divider network 40 with switching circuit 42 any other type of D/A conversion may be used. Similarly, counters 64a,b may be normal counters (that have digital number outputs counting upward e.g. like 0000, 0001, 0010, 0011, 0100 etc.) followed by any appropriate digital conversion circuit to control D/A converter circuits 14a,b. Preferably D/A converter circuits 14a,b share divider 40. Any combiner circuit 16 may be used, such as a current summing circuit for example for summing currents produced by D/A converter circuits 14a,b. Moreover, only the differences between the output signals of combiner circuit 16 are relevant: the difference between the voltage output in the state for detecting the maximum and the state for detecting the level crossing should be (V1+V2)/2, just like the difference between the state for detecting the level crossing and the voltage output in the state for detecting the minimum. Any common offset may be added to these voltages. Instead of voltages currents may be used both as outputs of the D/A converters and in the comparison etc.

Instead of separate D/A converter circuits 14a,b and combiner circuit 16 a single D/A converter circuit may be used, that is supplied with a tracking digital maximum value in the upward tracking mode, with a tracking digital minimum value in the downward tracking mode, (both optionally alternated with values to detect that the maximum or minimum has been passed), and with a (weighted) digital average of these minimum and maximum values in the relative level detection modes. This has the advantage that less area is required for D/A conversion. However, it means that any D/A conversion errors may cause undesirable offset voltages at the input of comparator 12.

Instead of using latch 19 the output of comparator 12 may be coupled directly to further circuits, control circuit 18 signaling to these further circuit when the output is valid. However, use of latch 19 makes level adjustment in the sensor circuit completely transparent for the further circuit Instead of a comparison between sensing signal 20 and the average (V1+V2)/2 in the relative level detection states, of course a comparison with any other signal (W1*V1+W2*V2)/(W1+W2) may be realized by suitable modification of combiner circuit 16. Similarly, it is not necessary that in the tracking modes combiner circuit 16 supplies signals that depend on respective ones of the output signals Va, Vb of one of the D/A converter circuits 14a,b only. For example, if a signal A*Va+B*Vb is supplied in the upward tracking mode, then first D/A converter circuit 14a will eventually assume an output value Va so that Vmax=A*Va+B*Vb, similarly if a signal C*Va+D*Vb is supplied in the downward tracking mode, then second D/A converter circuit 14b will eventually assume an output value Vb so that Vmin=C*Va+D*Vb. If the average of A*Va+B*Vb and C*Va+D*Vb is supplied in the relative level sensing state, that average will still equal (Vmax+Vmin)/2 (or any other weighted average). However it will be appreciated, if B or C are not equal to zero, a change in Vb may affect both the value used for Vmax and Vmin. This does not matter if Vmax and Vmin remain the same, provided that certain stability conditions are met (e.g. A>B and D>C if A, B, C and D are positive). When Vmax and Vmin vary a filtered version of the variations of Vmax and Vmin results.

The invention claimed is:

1. An electronic sensing circuit comprising
a sensor with an output for a sensing signal;
a comparator with a first and second comparator input, the output of the sensor being coupled to the first comparator input;
a control circuit arranged to switch the sensing circuit from an upward tracking mode to a downward relative level detection mode, to a downward tracking mode, to an upward relative level detection mode and back to the upward tracking mode successively;
a digital to analog converter, coupled to receive digital control signals from the control circuit, the control circuit having first output coupled to the digital to analog converter to cause the digital to analog converter to supply first and second output signals determined by first and second digital control signal values to the second comparator input in the upward and downward tracking mode respectively, and to supply a third output signal corresponding to an average of the first and second output signals to the second comparator input in the relative level detection modes;

the control circuit having an input coupled to the output of the comparator, the control circuit controlling one directional upward tracking by the first digital control signal value of upward changes of the sensing signal in the upward tracking mode, and controlling one directional downward tracking by the second digital control signal value of downward changes of the sensing signal in the upward tracking mode.

2. An electronic sensing circuit, according to claim 1, wherein the digital to analog converter comprises a first and second digital to analog conversion circuit, coupled to receive the first and second digital control signal value from the control circuit respectively;

a controllable combiner circuit with input coupled to outputs of the first and second digital to analog conversion circuits and an output coupled to the second comparator input, the control circuit having first output coupled to controllable combiner circuit to cause the combiner circuit to supply first and second combiner output signals determined by the first and second digital to analog conversion circuit to the second comparator input in the upward and downward tracking mode respectively, and to supply a third combiner output signal corresponding to an average of the first and second combiner output signals to the second comparator input in the relative level detection modes, the control circuit controlling one directional upward tracking by the first analog to digital conversion circuit of upward changes of the sensing signal in the upward tracking mode, and controlling one direction downward tracking by the second analog to digital conversion circuit of downward changes of the sensing signal in the upward tracking mode.

3. An electronic sensing circuit, according to claim 2, wherein the control circuit is arranged to reset the first and second digital control value at or before switching to the upward and downward tracking mode respectively, to a level below and above the value assumed during a previous upward and downward tracking mode respectively.

4. An electronic sensing circuit, according to claim 2, comprising a detection circuit for detecting whether the sensing signal has passed a maximum and/or minimum, the control circuit being arranged to control switching from the upward tracking mode to the downward relative level detection mode, and/or from the downward tracking mode to the upward relative level detection mode when the detection circuit detects that the sensing signal has passed the maximum and/or minimum respectively.

5. An electronic sensing circuit, according to claim 4, wherein said detection circuit is arranged to compare the sensing signal with a threshold between the average or the first and second combiner output signals and the first and/or combiner output signal to control switching from the upward and/or downward tracking mode respectively.

6. An electronic sensing circuit, according to claim 5, wherein the control circuit is arranged to cause the combiner circuit to switch between supplying the first and/or combiner output signal and the threshold to the second comparator input to control switching from the upward and/or downward tracking mode respectively.

7. An electronic sensing circuit, according to claim 4, wherein the detection circuit comprises a timer circuit for detecting whether or not transitions occur at the output of the comparator in a time interval of predetermined length in the upward and/or downward tracking mode.

8. An electronic sensing circuit, according to claim 2, comprising a latch circuit coupled to the output of the comparator, the control circuit having an output coupled to a control input of the latch circuit, so as to make the latch circuit follow the output signal of the comparator in the relative level detection modes and to latch the output signal of the comparator in the tracking modes.

9. An electronic sensing circuit, according to claim 2, wherein the combiner circuit forms the average so that is corresponds to an average wherein the first and second combiner signals have equal weight.

10. An electronic sensing circuit, according to claim 2, wherein the first and second analog to digital conversion circuits share a common voltage divider structure.

11. An electronic sensing circuit according to claim 10, wherein the first and second digital to analog conversion circuits each comprises a set of switches for passing voltages from selected nodes of the common voltage divider structure to the combiner circuit, under control of the control circuit.

* * * * *